United States Patent
Whitley

(10) Patent No.: US 6,728,556 B1
(45) Date of Patent: Apr. 27, 2004

(54) ATTACHMENT DEVICE FOR A MOBILE PHONE OR THE LIKE

(75) Inventor: Kevin James Whitley, South Hurstville (AU)

(73) Assignee: Amtel Technology PTY LTD, Botany (AU)

(*) Notice: Subject to any disclaimer, the term of this patent is extended or adjusted under 35 U.S.C. 154(b) by 0 days.

(21) Appl. No.: 09/536,839

(22) Filed: Mar. 27, 2000

(30) Foreign Application Priority Data

Aug. 5, 1999 (AU) .............................................. PQ2040

(51) Int. Cl.[7] ................................................. H04B 1/38
(52) U.S. Cl. ...................... 455/575.1; 455/95; 455/100; 455/569.1
(58) Field of Search ........................... 455/575, 90, 95, 455/100, 569, 575.1, 575.3, 575.4, 575.6, 90.3, 569.1; 379/446, 454, 455

(56) References Cited

U.S. PATENT DOCUMENTS 5,469,151 A * 11/1995 Lavelle et al. ......... 340/825.36
5,666,274 A * 9/1997 Corso .......................... 455/347
5,850,440 A * 12/1998 Hannon et al. ............. 379/446
6,290,534 B1 * 9/2001 Sadler ........................ 439/534

* cited by examiner

*Primary Examiner*—Quochien B. Vuong
*Assistant Examiner*—Thuan T. Nguyen
(74) *Attorney, Agent, or Firm*—Smith-Hill and Bedell

(57) ABSTRACT

A device for the attachment of mobile phones or like apparatus such that the mobile phone is held securely using a lug fastener or the like which is received in a receptacle. The attachment device consists of a one of the following; a pendant device, an armband device; a laptop cradle device; a vent clip device; the device including a body having a front side with the receptacle to receive the lug fastener. The receptacle has on opening sized to receive the full diameter of a protruding flange of the lug fastener, and a holding portion having a slot in the front side, the protruding flange being captured behind the front side with the stem of the lug fastener extending through a slot when in the held position.

20 Claims, 15 Drawing Sheets

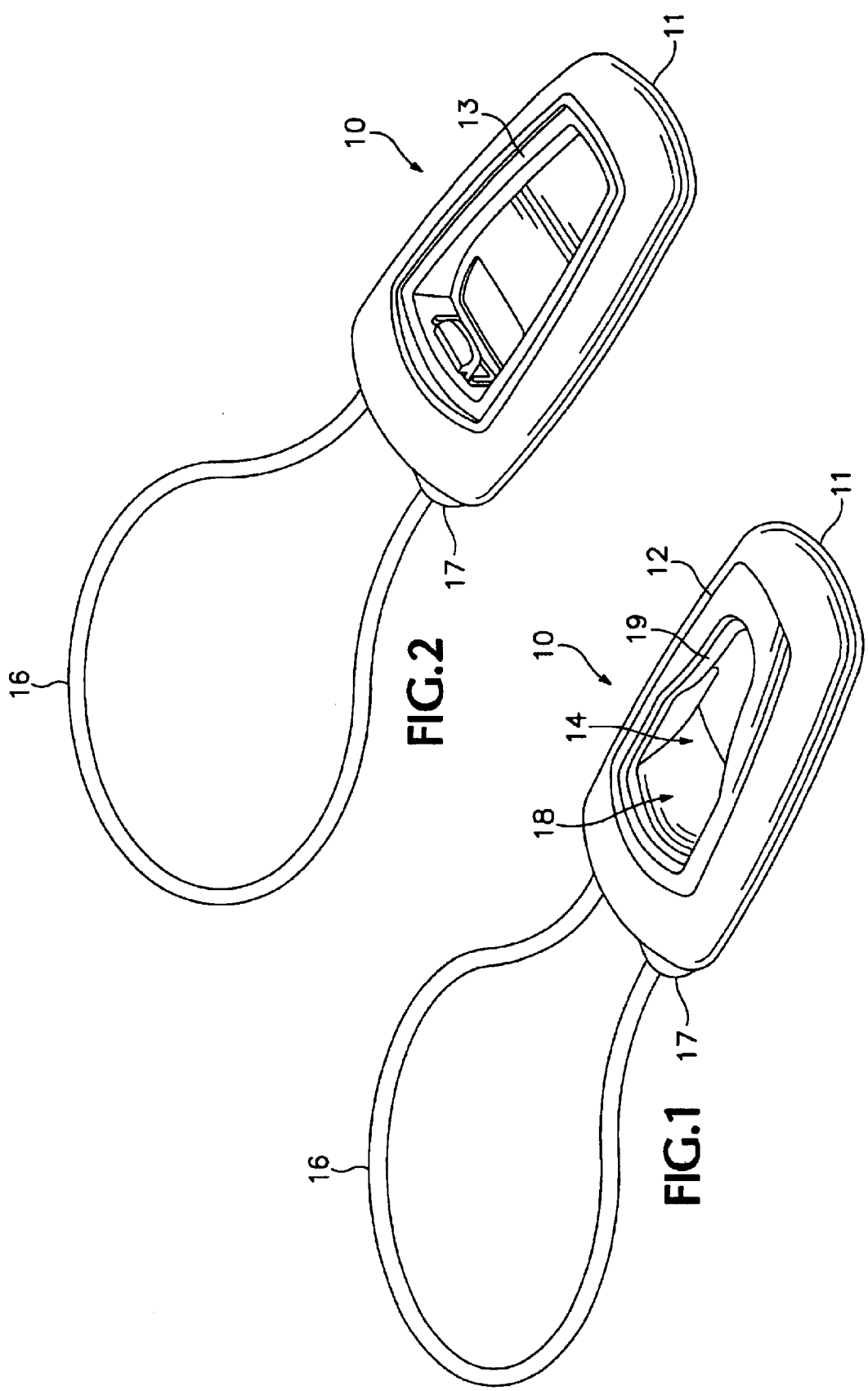

ATTACHMENT DEVICE FOR A MOBILE PHONE OR THE LIKE

The present invention relates to devices for the attachment of mobile phones or like apparatus to a person via a variety of garments or the like, to laptop computers, air vents in motor vehicles and the like, such that the mobile phone or other apparatus can be carried or not be inadvertently dislodged. The present invention also relates to devices for the attachment of mobile phones or like apparatus to a person via a variety of garments or the like, or to other secure objects such as air vents in motor vehicles and the like, such that a retractable microphone and speaker lead is provided associated with the attachment device such that the attachment device is used in association with a so-called personal hands free kit.

BACKGROUND OF THE INVENTION

It is very common for people to carry mobile phones and other like communication apparatus such as pagers etc clipped to their belt. The most common method of clipping a mobile phone to ones belt is by inserting the phone into a protective case which has a rigid spring operated clip attached thereto. Other methods use rigid clips which are actually attached or integral to the phone itself.

These methods of clipping mobile phones to belts have the disadvantage that as the clips are rigidly connected to the phone or protective case, the phone can be inadvertently dislodged from the belt due to the movement of the person, sitting down, walking, etc. as the phone can be knocked or rotated by the person's leg. There is also the disadvantage that the use of such clips can cause discomfort as the phone is rigidly set against the person's waist. It is desirable for other means of carrying mobile phone handsets be devised.

When driving in motor vehicles, if the mobile phone is not held in a proprietary hands free kit cradle, it is usually placed on the seat besides the driver with a so-called person hands free kit connected to the handset. Such a position is inconvenient to the driver and hampers the reception of the mobile phone as they are preferably to be used at glass height and upright for the best reception using the antenna of the handset. Therefore it is seen that it is also desirable that the handset be held in a convenient location for use with a personal hands free kit when being used in a motor vehicle.

Similarly, when the mobile phone handset is located in the home or office and is not attached to the person of the user, the handset is usually left lying around. This can often lead to handsets being misplaced. Furthermore, in the office, the mobile phone can be used to transmit data over the network from a computer and the like. It is often the case that a mobile phone handset is used in conjunction with a laptop computer and its associated modem to transmit data over the internet as well as sending faxes etc. Therefore it is desirable that the handset can be placed in a holder or receptacle convenient to the user depending on the type of use.

Furthermore, when a person is using a personal hands free kit with their mobile phone, the lead associated with the microphone and ear piece speaker arrangement can be inadvertently caught in loose clothing or the like. It would be advantageous for the lead to be retractable so that its length is suitable for the person and situation of its use and that it is out of the way when not in use.

OBJECT OF THE INVENTION

It is an object of the present invention to provide improved devices for the attachment and use of mobile phones or like apparatus which substantially overcomes or ameliorates the above mentioned disadvantages. At the very least the invention provides alternatives to previously proposed attachment devices.

DISCLOSURE OF THE INVENTION

According to the present invention there is provided a device for the attachment of mobile phones or like apparatus such that the mobile phone is held securely using a lug fastener or the like which is received in a receptacle.

In one preferred form of the invention, the attachment device consists of a pendant device to which a tether is preferably attached. The pendant device includes a body having a front side with a receptacle to receive the lug fastener. The receptacle has on opening sized to receive the full diameter of a protruding flange of the lug fastener, and a holding portion having a slot in the front side, the protruding flange being captured behind the front side with the stem of the lug fastener extending through a slot when in the held position. A spring clip is provided to hold the protruding flange when it is in the held position, the protruding flange and hence the mobile phone being able to rotate when held.

In another preferred form of the invention, the attachment device consists of a general purpose clip device which is fixable to another object. The general purpose clip device includes a body having a front side with a receptacle to receive a lug fastener and a rear side which is preferably fixable to the other object. The receptacle has on opening sized to receive the full diameter of a protruding flange of the lug fastener, and a holding portion having a slot in the front side, the protruding flange being captured behind the front side with the stem of the lug fastener extending through a slot when in the held position. A spring clip is provided to hold the protruding flange when it is in the held position. The device further includes an alignment guide means to correctly align the protruding flange within the receptacle, the protruding flange having corresponding alignment guide means. Preferably the phone or like apparatus is held in an upright orientation.

Preferably the device is fixed by means of screws which are inserted from within the receptacle the front side of the device being detachable to allow access.

In a further form of the invention, the attachment device consists of a armband device suitably held on an arm or the like of a person by an armband. The armband device includes a body having a front side with a receptacle to receive a lug fastener and a rear side which is preferably fixable to the other object. The receptacle has on opening sized to receive the full diameter of a protruding flange of the lug fastener, and a holding portion having a slot in the front side, the protruding flange being captured behind the front side with the stem of the lug fastener extending through a slot when in the held position. A spring clip is provided to hold the protruding flange when it is in the held position. The device further includes an alignment guide means to correctly align the protruding flange within the receptacle, the protruding flange having corresponding alignment guide means. Preferably the phone or like apparatus is held in an upright orientation.

The body further includes side extensions having slots therein to receive the armband and thus hold the device abutting against the arm when in use.

In a still further preferred form of the invention, the attachment device consists of a laptop cradle device which is securable to a laptop computer. The laptop cradle device includes a body having front and rear sides with a pair of opposing slots to receive a lug fastener with a stem of the lug fastener extending through a slot and a protruding flange of the lug fastener, being positioned on the rear side with the phone being positioned on the front side when in the held position. The device further includes a releasable clamp means to clamp onto the side of the display portion of the laptop computer, the releasable clamp means being adjustable to fit onto varying thicknesses found with different makes of laptop computers.

The opposing slots are provided in order that the device can be fixed to either the left or right side of the display portion.

In a still further preferred form of the invention, the attachment device consists of a vent clip device for a motor vehicle such that the phone or like apparatus is held in a position in the cabin adjacent the driver. The vent clip device includes a body having a front side with a receptacle to receive a lug fastener and a rear side which is preferably fixable to the other object. The receptacle has on opening sized to receive the full diameter of a protruding flange of the lug fastener, and a holding portion having a slot in the front side, the protruding flange being captured behind the front side with the stem of the lug fastener extending through a slot when in the held position. A spring clip is provided to hold the protruding flange when it is in the held position. The device further includes an alignment guide means to correctly align the protruding flange within the receptacle, the protruding flange having corresponding alignment guide means. Preferably the phone or like apparatus is held in an upright orientation.

Preferably the body has a rear side being mateable with a vent clip adapted to be fitted to the vents and having a pair of extendable legs and feet which are position and securely clamped against the vents to prevent movement, the clip being positioned across the vent either vertically or horizontally.

In a still further preferred form of the invention, the attachment device consists of a retractor belt clip device which includes a retractable lead for a personal hands free kit or other similar device such as speaker leads for personal CD or tape device. The device includes a receptacle body and corresponding flanged lug fastener which is attached to the mobile phone or like apparatus, the receptacle being adapted to be attached to a belt or the like by means of a clip means positioned on the receptacle body. The body has an opening located at its top side portion into which the flange of said lug fastener is received with the lug fastener extending through a slot on said receptacle body communicating with the opening such that the mobile phone or like apparatus is positioned outside and adjacent the receptacle body when the lug fastener is received within the receptacle body. The device further includes a locking means within said receptacle body, the locking means having a carriage movable between a receiving position and a holding position, the carriage receiving the flange of the lug fastener when the moveable carriage is in the receiving position, and the carriage has holding means to capture and hold the flange of the lug fastener within the carriage when the moveable carriage is moved into the holding position preventing the flange from rotating.

Preferably, the locking means further includes a release means which releases the moveable carriage from the holding position. The carriage is preferably locked in the holding position by a flange and stop means which engage, the carriage being released by the release means which is preferably an external button communicating through an opening in the body, the release means being manipulated to force the flange and stop means from their engagement.

The device further includes a further compartment in which a microphone and speaker lead on a spool is located, the spool being able to rotate thus releasing or retracting the lead when required. The spool is connected to a phone connector means which is connected to the phone or other such audio device when it is held in the device.

Preferably, the spool is held adjacent a circuit board and brush means on the spool make the electrical contact between the lead and the connector means. Preferably the spool is spring operated with a stop/release mechanism controlling its operation.

In a still further form of the invention, the device consists of a retractor belt clip device as described above used in conjunction with a vent clip device as described above with the clip means positioned on the receptacle body being receivable within a corresponding adapter attached to the vent clip adapted to be fitted to the vents. Other forms include the retractor clip device being used with the pedant device and armband device.

BRIEF DESCRIPTION OF THE DRAWINGS

One embodiment of the present invention will now be described with reference to the drawings in which:

FIG. 1 is a front perspective view of a pendant device according to a preferred embodiment of the invention, FIG. 2 is a rear perspective view of the pendant device of FIG. 1.

BEST MODE OF CARRYING OUT THE INVENTION

Figure 3:
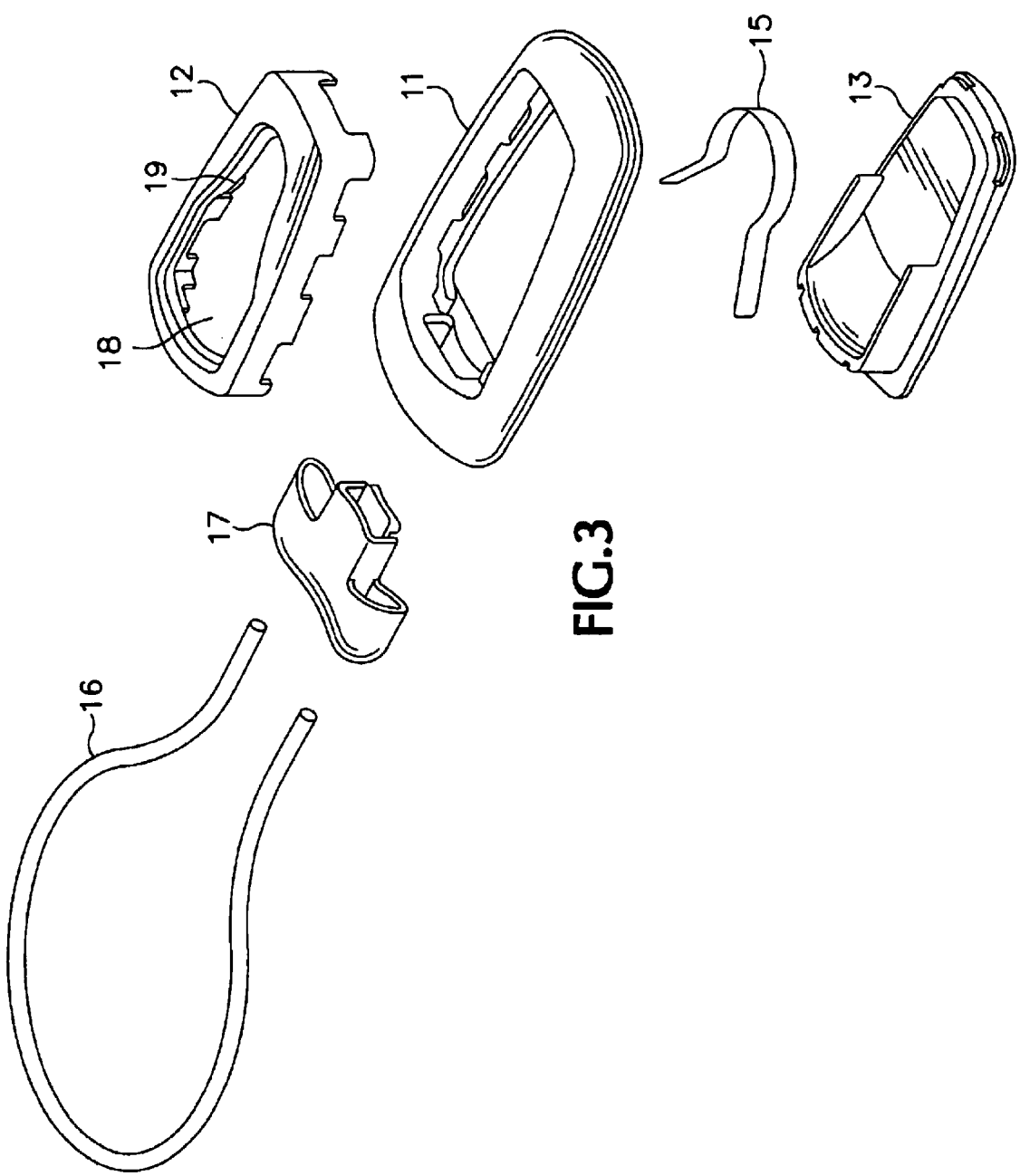
FIG. 3 is an exploded perspective view of the pendant device of FIG. 1.

A pendant device 10 as illustrated in FIGS. 1 to 3 is used to hold a mobile phone or the like (not illustrated) and is preferably to be worn around the neck but can be used as a holster under the arm or can be tethered to a handbag or the like such that when the phone is in the handbag it can be easily retrieved therefrom.

The device 10 comprises a body 11 having front 12 and a rear 13 and a removable outer cover. The body 11 is hollow with the rear 13 being sandwiched between the front 12 and outer cover to form a receptacle 14 in which a spring clip 15 is arranged to receive a lug fastener (not illustrated) which is attached to the rear of a mobile phone (not illustrated. A tether 16 held by an end clip 17 which is removable from the body 11 provides the means by which the device 10 can be placed over the head of the person using the device 10.

The receptacle 14 has an opening 18 sized to receive the full diameter of a protruding flange of the lug fastener, and a holding portion having a slot 19 in the front 12, the protruding flange being captured behind the front 12 with the stem of the lug fastener extending through the slot 19 when in the held position. The spring clip 15 is provided to hold the protruding flange when it is in the held position with the protruding flange and hence the mobile phone being able to rotate when so held.

Figure 4:
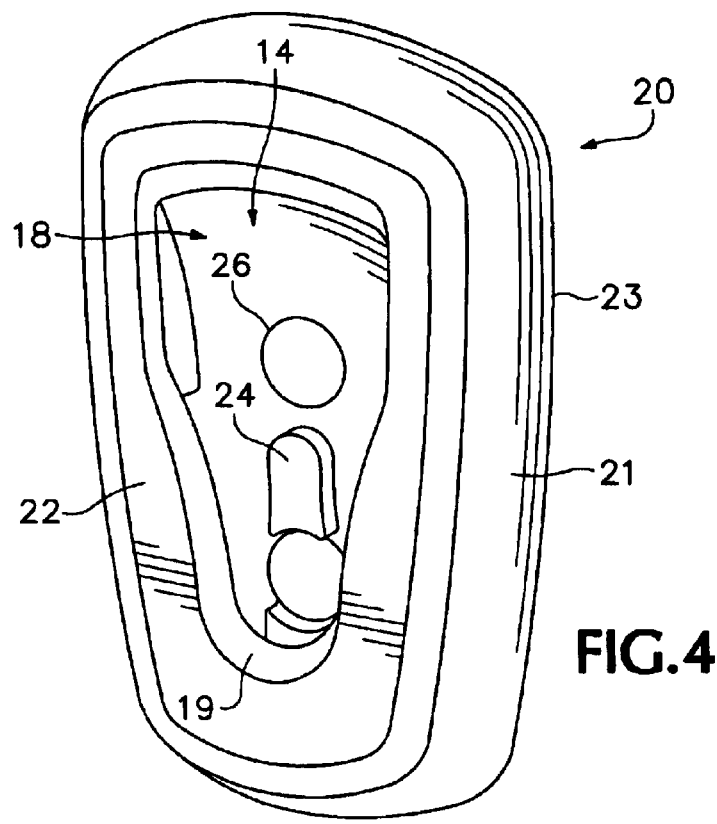
FIG. 4 is a front perspective view of a general purpose clip device according to another embodiment of the invention.
Figure 5:
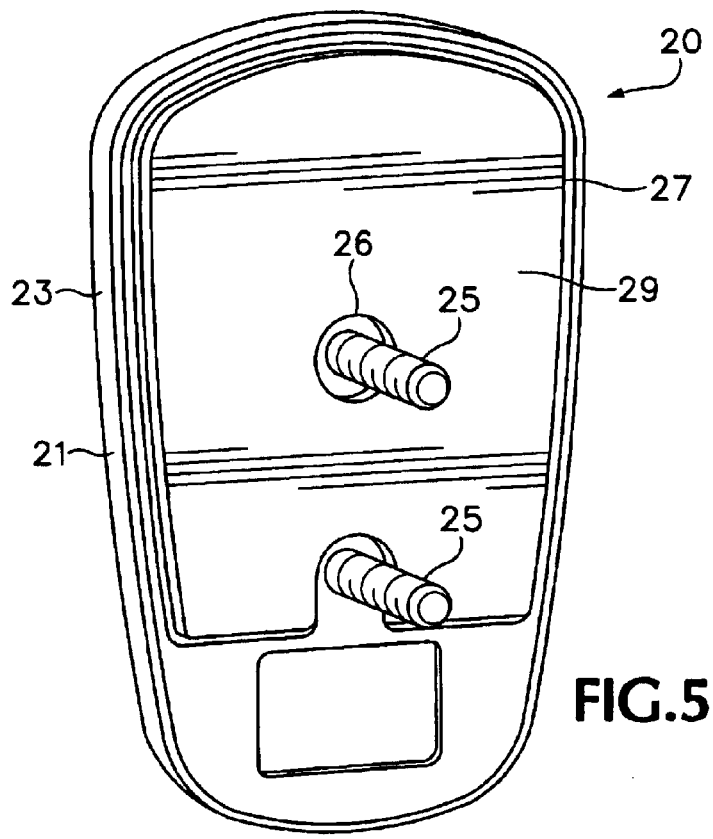
FIG. 5 is a rear perspective view of the general purpose clip device of FIG. 4.
Figure 6:
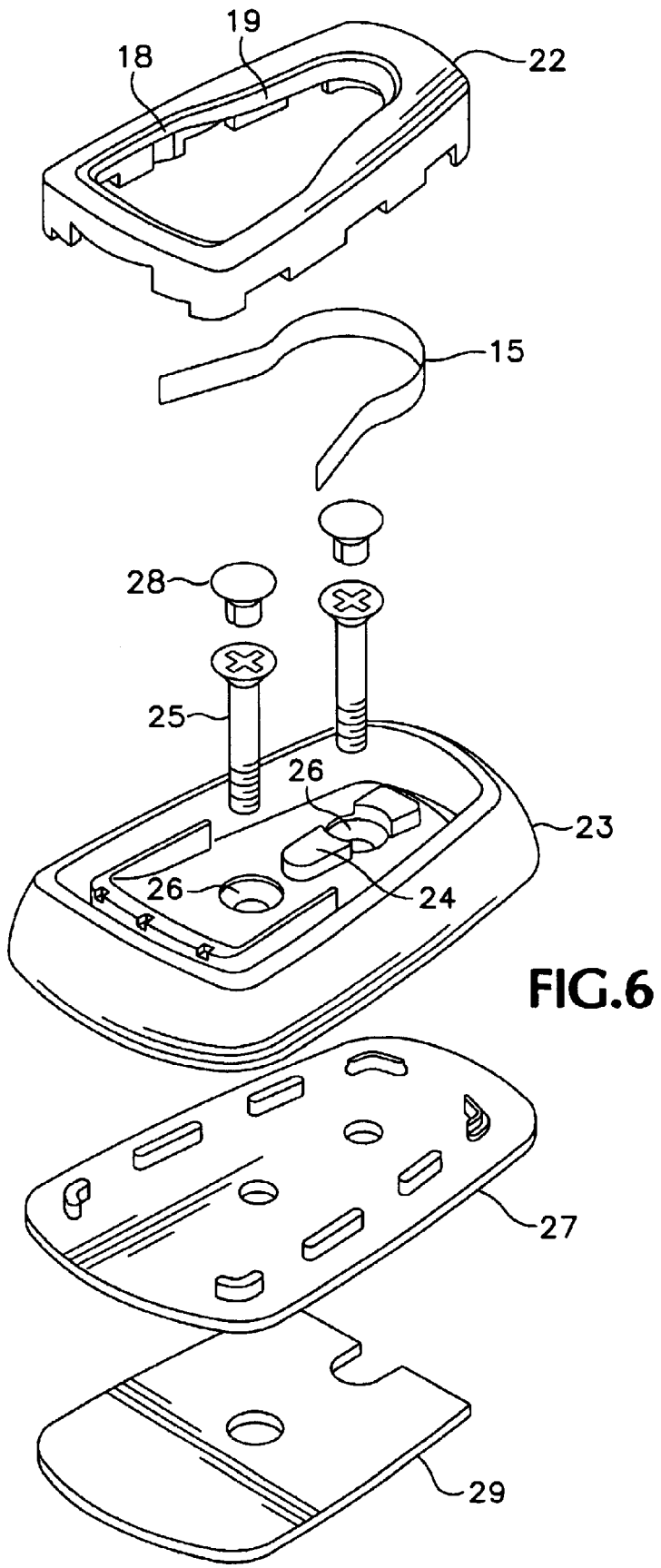
FIG. 6 is an exploded perspective view of the general purpose clip device of FIG. 4, is a a fastener used with the device of FIG. 1.

A general purpose clip device 20 as illustrated in FIGS. 4 to 6 is used to hold a mobile phone is preferably mounted on any convenient wall, cabinet. Computer monitor, motor vehicle etc whether it is mounted by screws, double sided tape or the like.

Similar to the pendant device 10, the general purpose clip device 20 comprises a body 21 having front 22 and a rear 23. The body 21 is hollowed with the front 22 being clipped to the rear 23 to form the receptacle 14 in which the spring clip 15 is arranged to receive a lug fastener which is attached to the rear of a mobile phone. A protruding guide 24 is located on the front of the rear 23 and is used to align a corresponding groove of the lug fastener. A pair if screws 25 are preferably provided to be inserted through holes 26 in the rear 23 and cover 27 when the device 20 is to be mounted by screw means. Screw caps 28 provide cover to the screws 25. Double sided adhesive tape 29 is also preferably provided when the device 20 is to be so mounted.

The receptacle 14 has the opening 18 sized to receive the full diameter of a protruding flange of the lug fastener, and a holding portion having the slot 19 in the front 22, the protruding flange being captured behind the front 22 with the stem of the lug fastener extending through the slot 19 when in the held position. The spring clip 15 is provided to hold the protruding flange when it is in the held position with the protruding guide 24 mating with the groove on the flange to hold the flange hence the mobile phone in an upright position. Depending on the orientation of the groove, the orientation of the phone can be varied as desirable.

Figure 7:
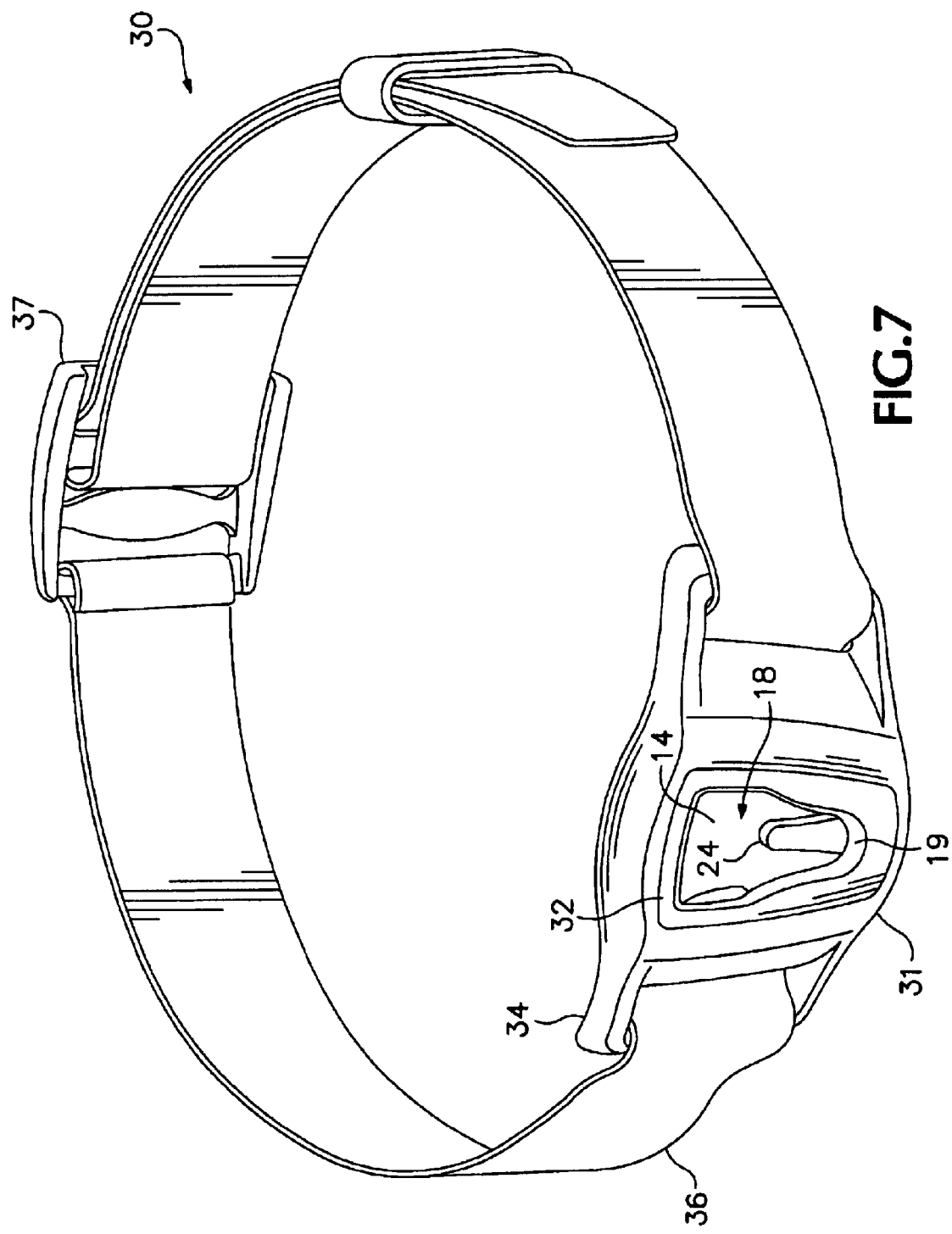
FIG. 7 is a front perspective view of a armband device according to a further embodiment of the invention.
Figure 8:
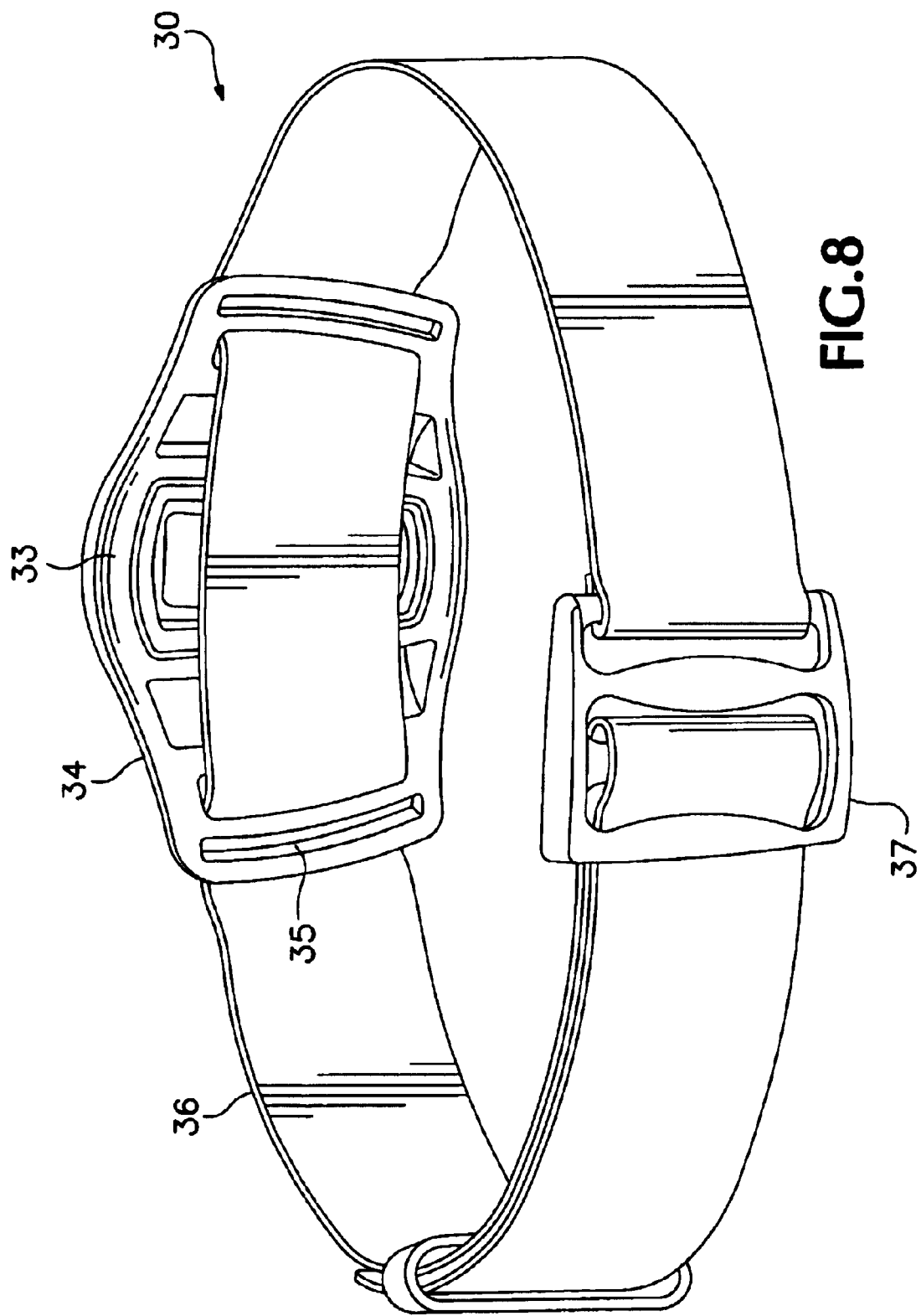
FIG. 8 is a rear perspective view of the armband device of FIG. 7.
Figure 9:
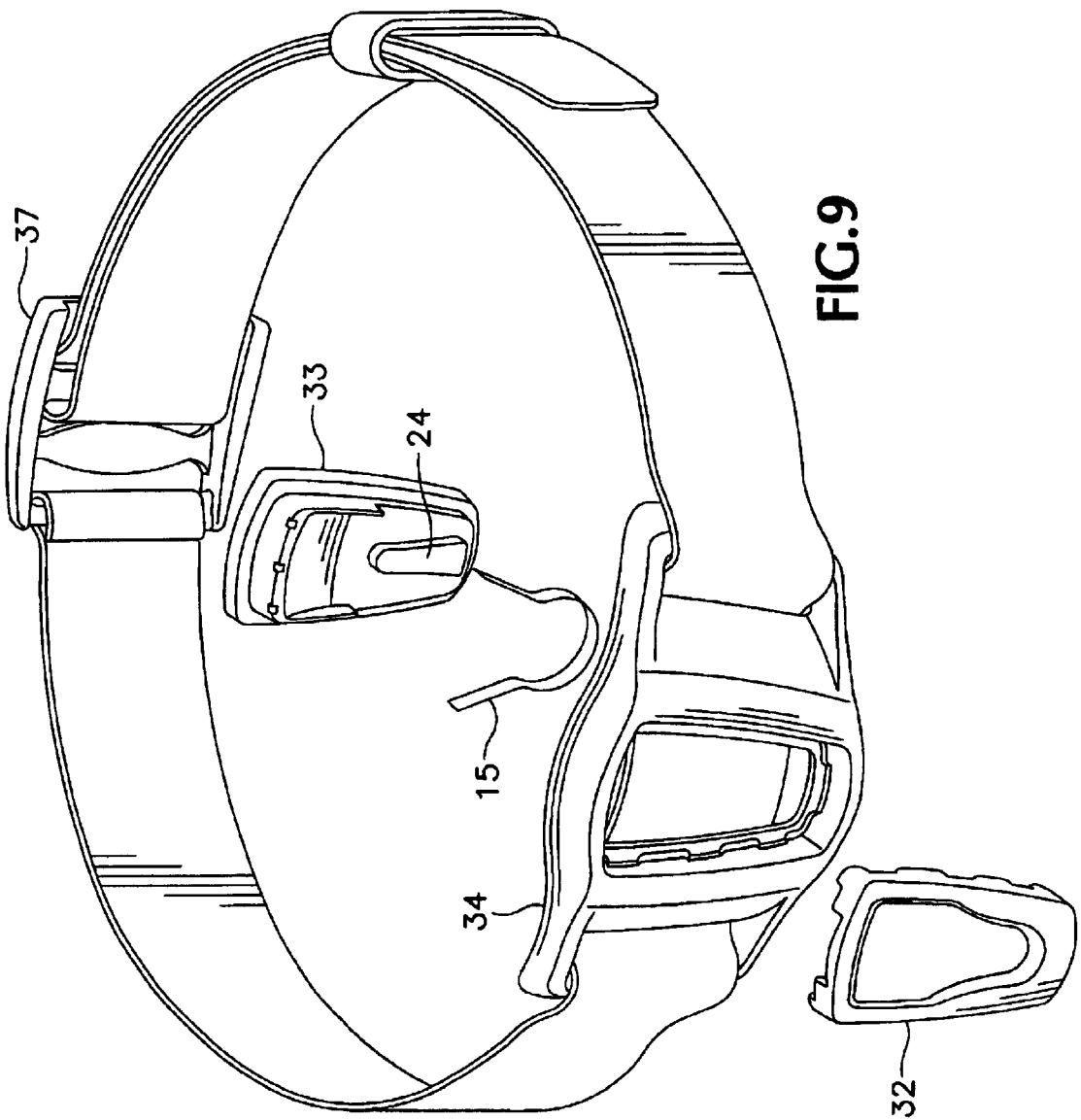
FIG. 9 is an exploded perspective view of the armband device of FIG. 7.

An armband device 30 as illustrated in FIGS. 7 to 9 is used to hold a mobile phone on the arm and is preferably used when the user is exercising, eg jogging, with the phone held abutting against the arm to prevent bouncing around.

Similar to the pendant device 10 and the general purpose clip 20, the armband device 30 comprises a body 31 having front 32 and a rear 33. The body 31 is hollow with the front 32 and the rear being clipped to the body 31 to form the receptacle 14 in which the spring clip 15 is arranged to receive a lug fastener which is attached to the rear of a mobile phone. The protruding guide 24 is located on the front of the rear 33 and is used to align a corresponding groove of the lug fastener. The body 31 further includes a pair of side extensions 34 having slots 35 through which an armband strap 36 passes. The strap 36 is preferably made from stretchable material and is able to be tightened using an adjustable clip 37.

The receptacle 14 has the opening 18 sized to receive the full diameter of a protruding flange of the lug fastener, and a holding portion having the slot 19 in the front 32, the protruding flange being captured behind the front 32 with the stem of the lug fastener extending through the slot 19 when in the held position. The spring clip 15 is provided to hold the protruding flange when it is in the held position with the protruding guide mating with the groove on the flange to hold the flange hence the mobile phone in an upright position. Depending on the orientation of the groove, the orientation of the phone can be varied as desirable.

The armband device 30 is preferably made from soft materials and can be used for other devices such as Walkmans® and can be attached to the midriff or to a leg as desired.

Figure 10:
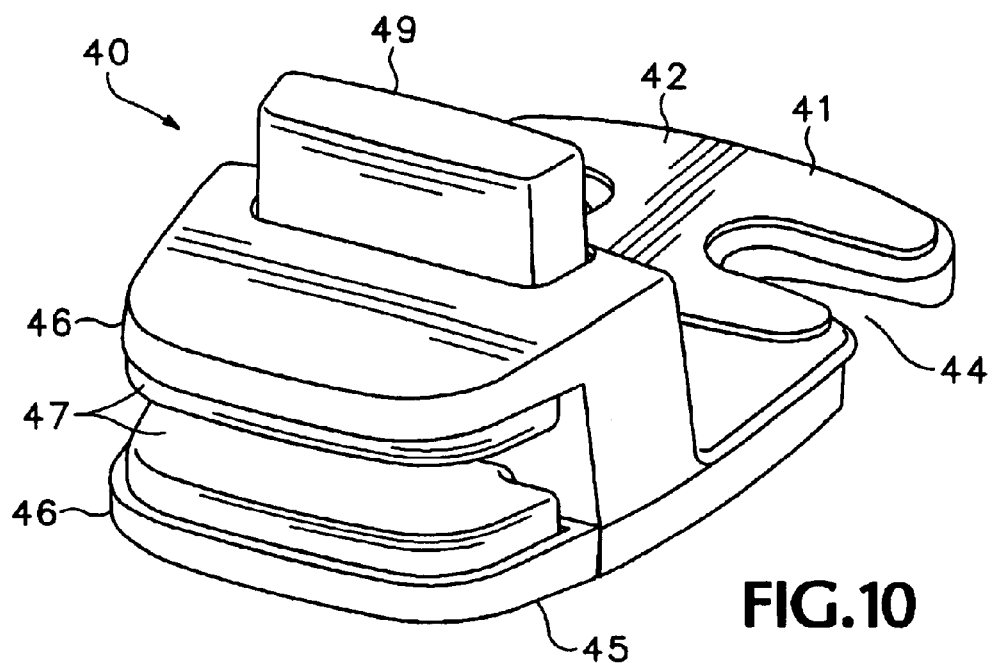
FIG. 10 is a front perspective view of a laptop cradle device according to a still further embodiment of the invention.
Figure 11:
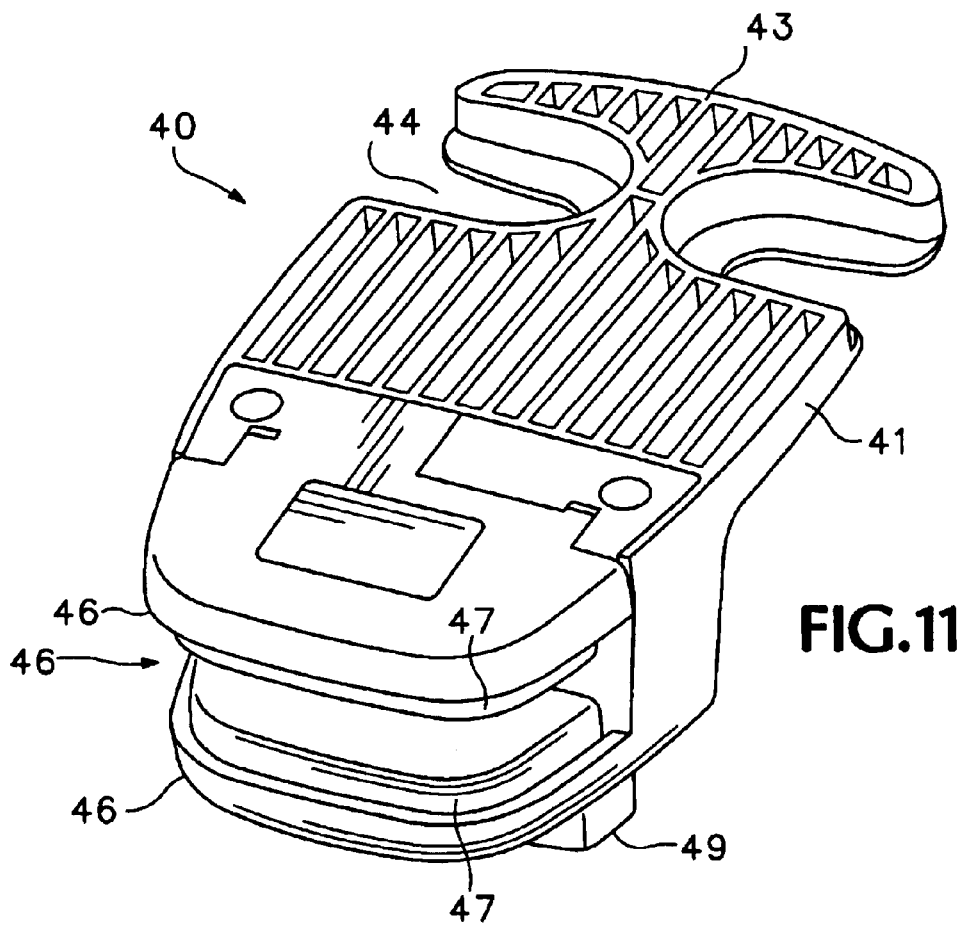
FIG. 11 is a rear perspective view of the laptop cradle device of FIG. 10.
Figure 12:
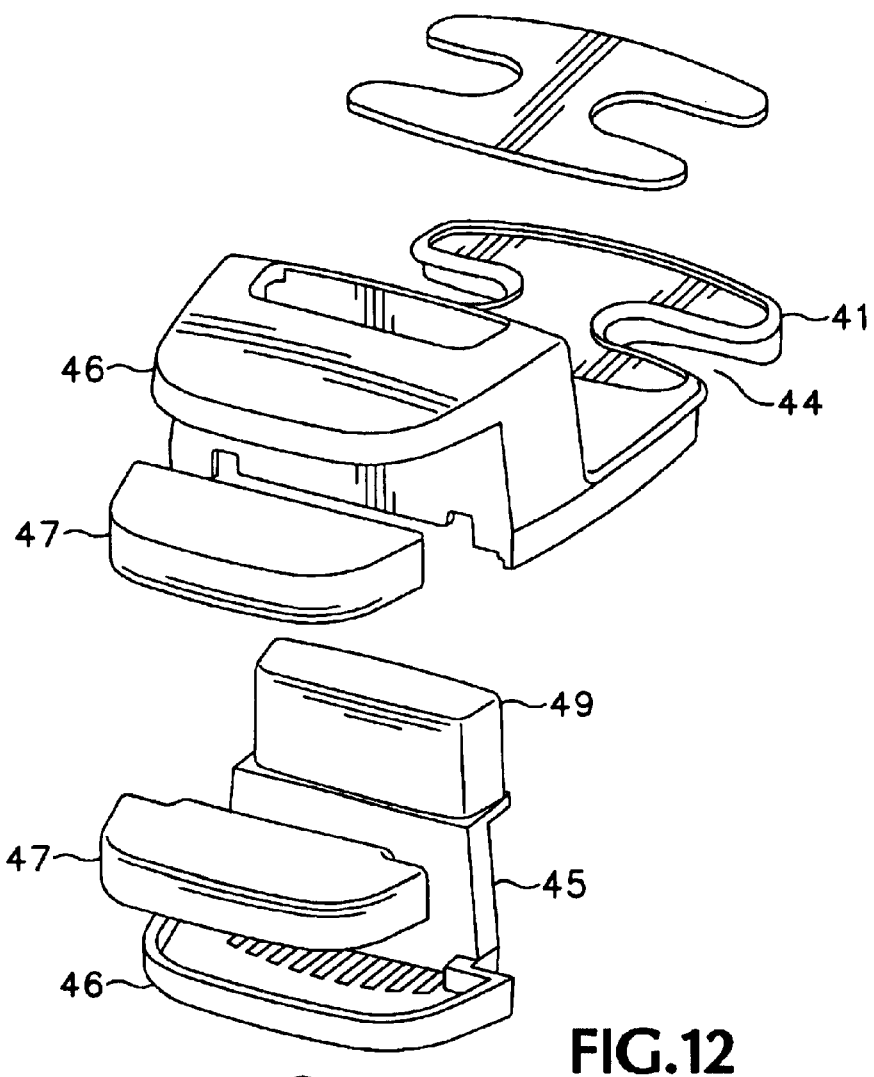
FIG. 12 is an exploded perspective view of the laptop cradle device of FIG. 10.

A laptop cradle device 40 as illustrated in FIGS. 10 to 12 is used to hold a mobile phone on the screen portion of a laptop computer (not illustrated).

The device 40 includes a body 41 having a front 42 and a rear 43 with a pair of opposing slots 44 arrange to receive the lug fastener with the stem of the lug fastener extending through the slot 44 with the protruding flange being positioned adjacent the rear 43 and the phone adjacent the front 42 when the phone is held in position.

A releasable clamp 45 having an opposing pair of fingers 46 with pads 47 attached thereto, is used to clamp onto the screen portion of the laptop computer. The clamp 45 uses a pair of springs 48 with a button release mechanism 49 to urge the fingers 46 and pads 47 against the screen portion. The pads 47 can be adjusted in their width so that the device 40 can be used for laptop computers having different widths in their screen portion. For example widths vary from between 6 mm to 16 mm.

The device 40 can be used on either side of the screen portion due to the provision of the pair of slots 44 and therefore can be conveniently used by both right and left handed persons. The device 40 is a convenient place of storage of a mobile phone and is most suitable for data transfer using the laptop computer.

Figure 13:
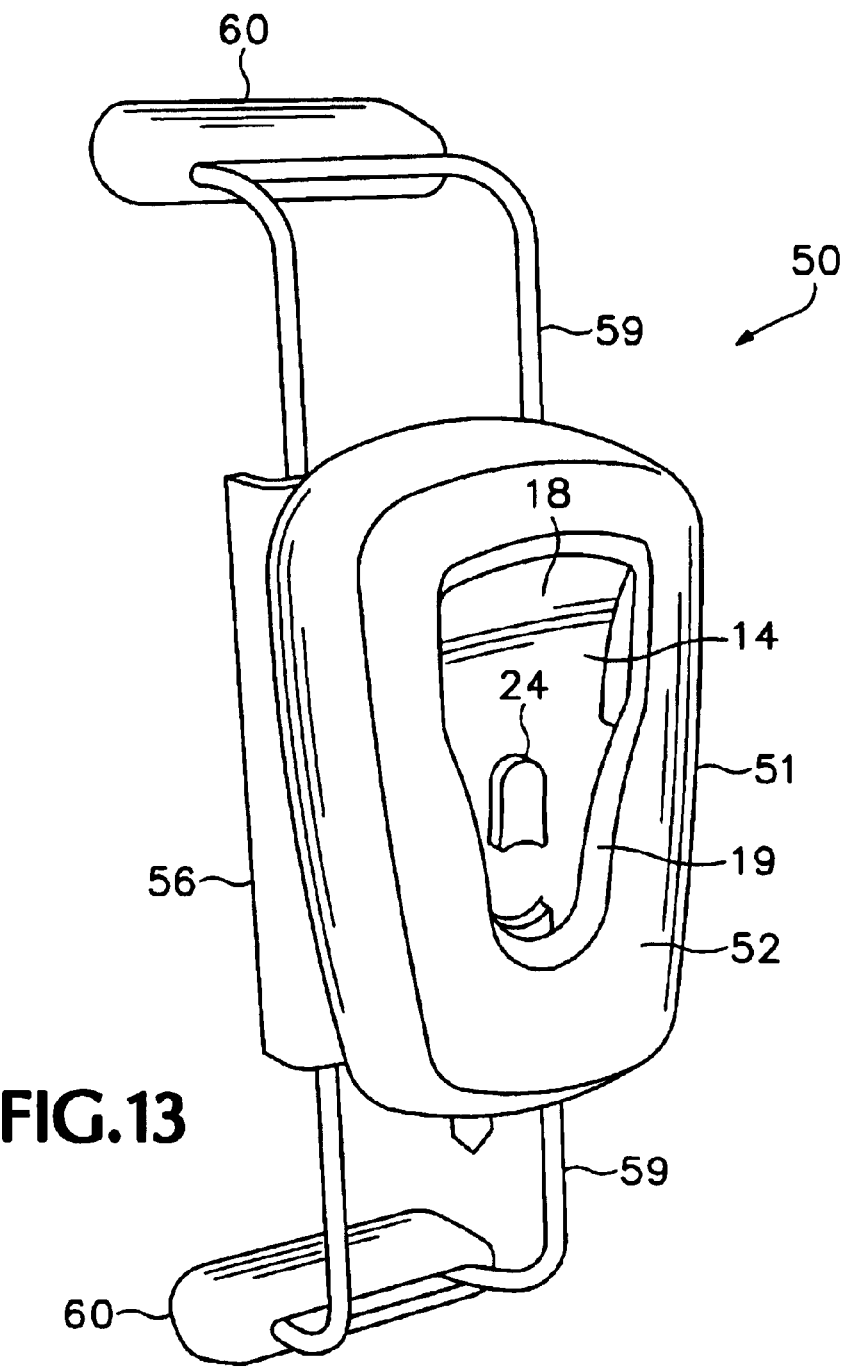
FIG. 13 is a front perspective view of a vent clip device according to a still further embodiment of the invention, FIG. 14 an exploded perspective view of the vent clip device of FIG. 13.
Figure 14:
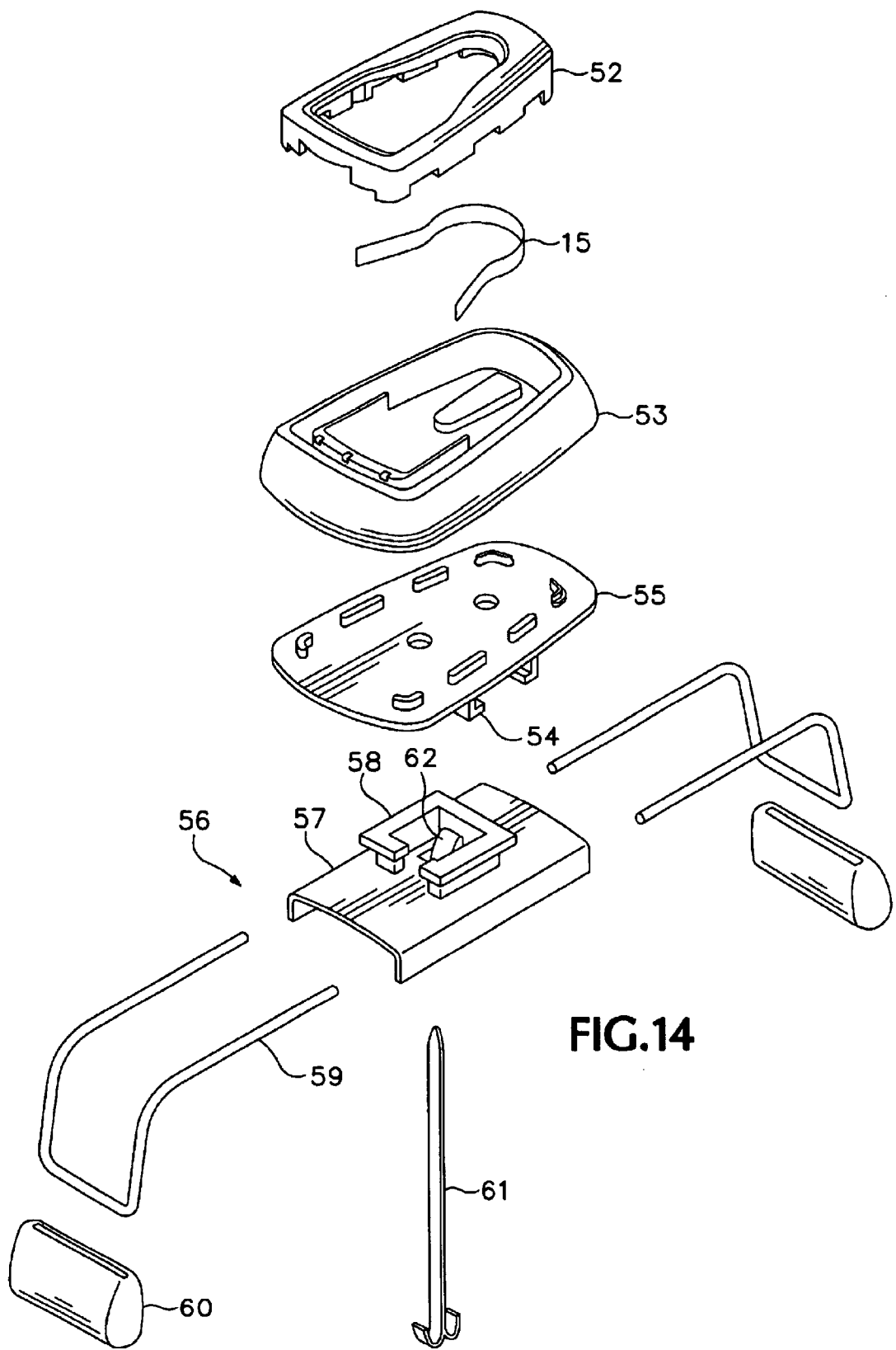

A vent clip device 50 as illustrated in FIGS. 13 and 14 is used to hold a mobile phone in the cabin of a motor vehicle adjacent a vent adjacent the driver.

Similar to the general purpose clip 20, the vent clip device 50 has a body 51 having front 52 and a rear 53. The body 51 is hollowed with the front 52 being clipped to the rear 53 to form the receptacle 14 in which the spring clip 15 is arranged to receive a lug fastener which is attached to the rear of a mobile phone. The protruding guide 24 is located on the front of the rear 53 and is used to align a corresponding groove of the lug fastener. A bracket 54 is provided on the rear of a cover 55 so that the body 51 can be attached to a vent attachment part 56.

The vent attachment part 56 includes a vent clip body 57 with a corresponding bracket 58 which is adapted to mate with the bracket 54 on the rear of the cover 55. The part 56 further includes a pair of legs 59, which are adjustable in length, and which extend from opposite sides of the body 57. A corresponding pair of feet 60 are located on the free ends of the legs 59.

The vent attachment part 56 is attached to a vent by adjusting the lengths of the legs 59 and accordingly placing the feet 60 against inside opposing edges of the vent, ie not on or against the movable or pivotable vanes of the vent, and by using a ratchet hook device 61 which passes through openings 62 in the body 57 and behind the movable or pivotable vanes of the vent respectively, and pulling it tight thus pulling the part 56 against the vent. The part 56 is therefore immobilised and cannot be moved with any motion of the vanes of the vent.

Similar to the general purpose clip 20, the receptacle 14 has the opening 18 sized to receive the full diameter of a protruding flange of the lug fastener, and a holding portion having the slot 19 in the front 52, the protruding flange being captured behind the front 52 with the stem of the lug fastener extending through the slot 19 when in the held position. The spring clip 15 is provided to hold the protruding flange when it is in the held position with the protruding guide 24 mating with the groove on the flange to hold the flange hence the mobile phone in an upright position.

Depending on the type of vent, the vent clip device 50 can be placed either vertically or horizontally across the vent in order that the phone is kept in an upright orientation. It is seen that the vent clip device 50 can be installed without using any tools and as the feet 60 are preferably made from a soft rubber like material they are not prone to slip. Furthermore, as the phone is seen to be kept upright and located about the height of the glass in the motor vehicle, the location and orientation provides substantially maximum signal strength and can be used with a personal hands free kit.

Figure 15:
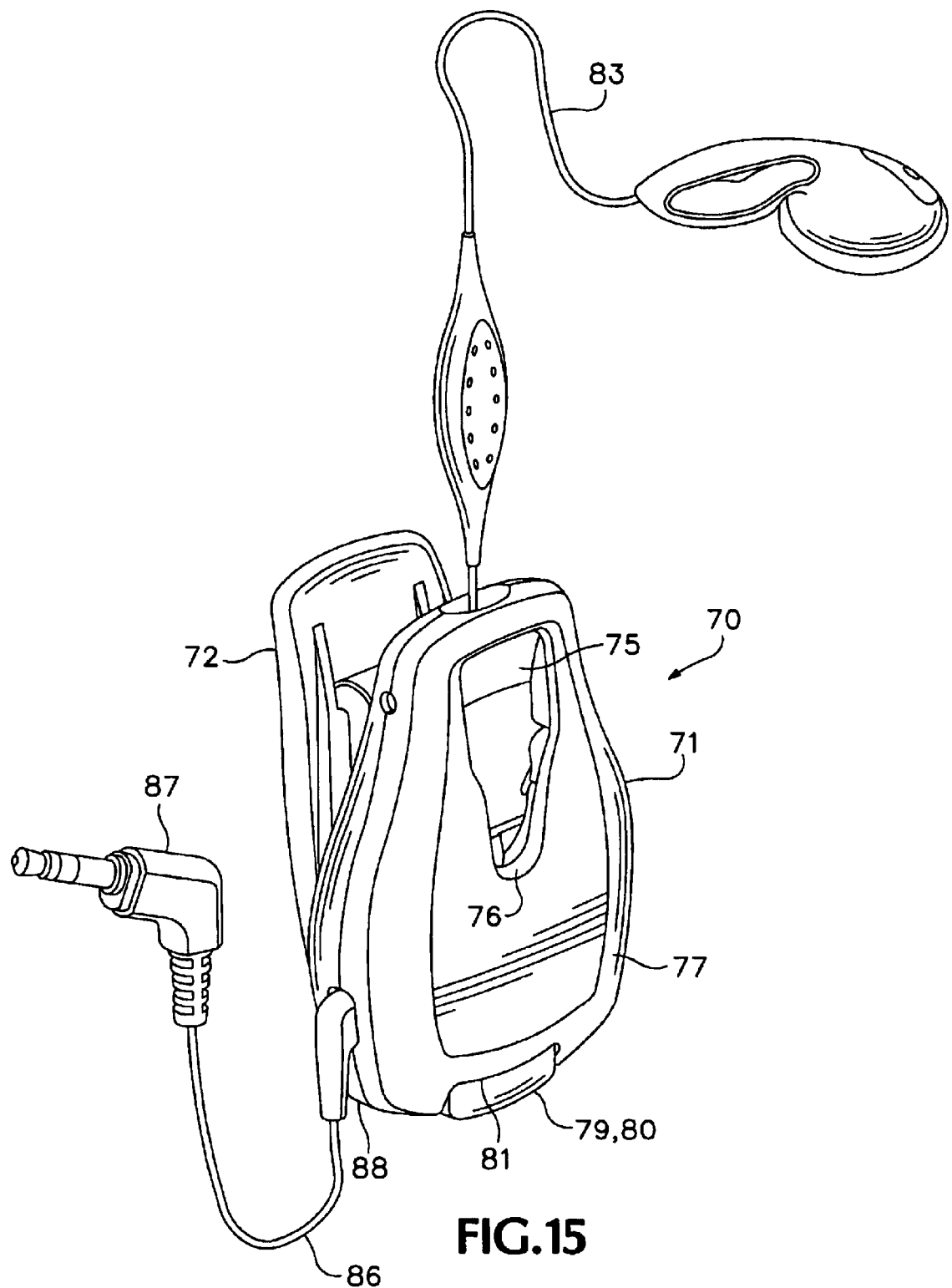
FIG. 15 is a front perspective view of a retractor belt clip device according to a still further embodiment of the invention.
Figure 16:
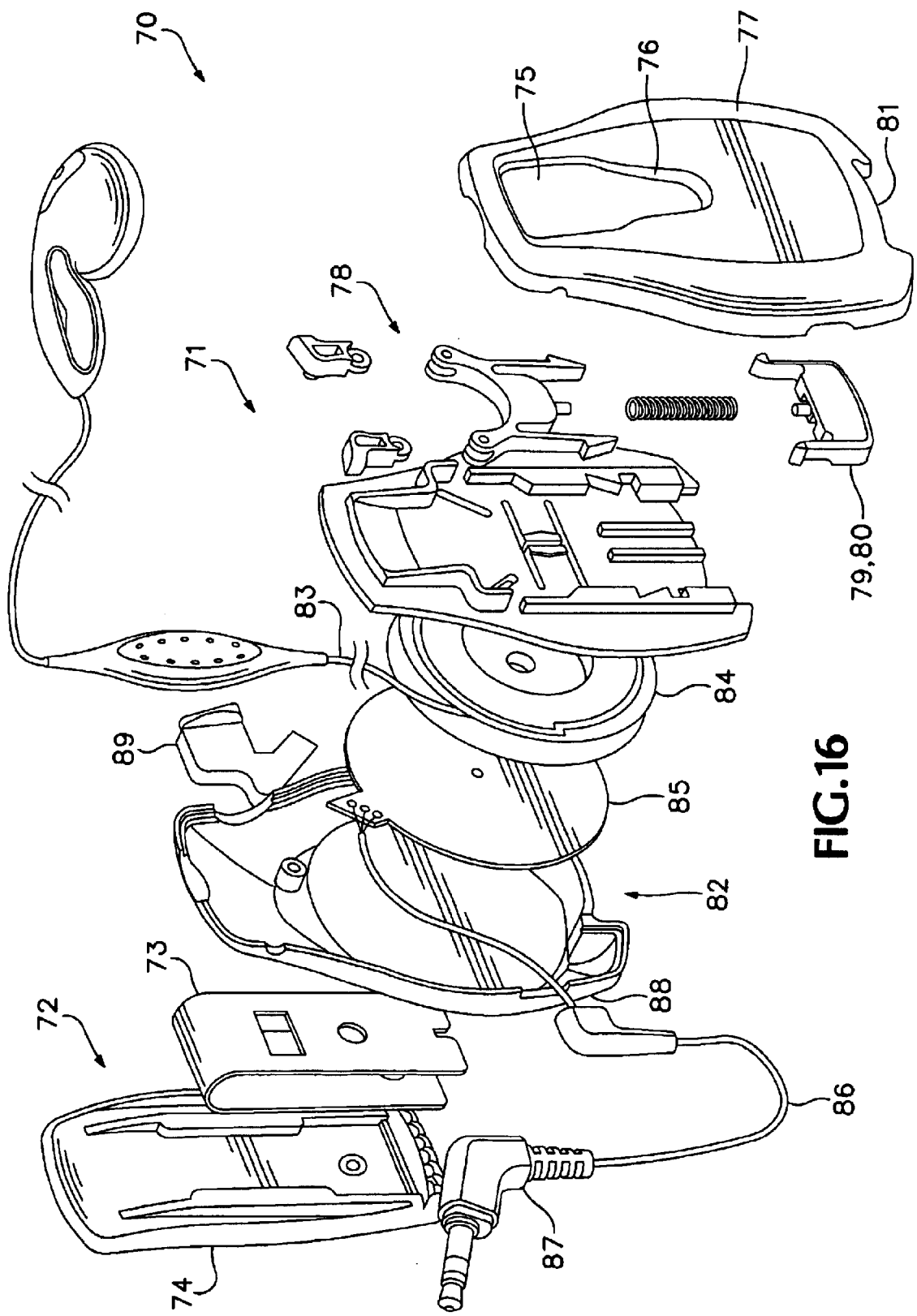
FIG. 16 is an exploded perspective view of the retractor belt clip device of FIG. 15.

A retractor belt clip device 70 as illustrated in FIGS. 15 and 16 is used to hold a mobile phone in a belt clip and includes a retractable lead of a personal hands free kit or other audio device.

The device 70 is used for the attachment of a mobile phone or like apparatus to a belt (not illustrated) or other garment of a user when the user is carrying their mobile phone on their person. The mobile phone is attached to the device 70 by means of the flanged lug fastener being received by the device 70. The clip device 70 works substantially as the clip device described in our co-pending application Ser. No. PCT/AU98/00633.

The device 70 includes a body 71 into which the flanged lug fastener is received and locked into place allowing or restricting rotation while so locked. The body 71 has a spring clip 72 on its rear, the spring clip 72 being attachable to a belt or like piece of clothing. The spring clip 72 includes a folded leaf spring 73 and an attachment clip portion 74, the spring 74 being connected between the rear of the body 71 the attachment clip portion 74.

The body 71 has an opening 75 into which the lug fastener is received. The flange of the lug fastener is received within the opening 75 while the stem extends through a slot 76 on the front 77 of the body 71. The slot 76 communicates with the opening 75 and therefore the lug fastener is able to be slid into the body 71 with the flange being captured behind the front 77.

A moveable carriage 78 and release button 79 are located within the receptacle body 71. The moveable carriage 78 is located totally within the body 71 and is reciprocally movable between a receiving position and a holding position while the release button 79 is partially located within the body 71 with a button portion 80 extending out from an aperture 81 in the body 71 with a release mechanism portion 81 being located within the body 71.

The device 70 includes a further compartment 82 in which a microphone and speaker lead (or other type of lead) 83 wound on a spool 84 is located. The spool 84 is rotatable relative to a printed circuit board 85 which is connected via a secondary lead 86 to a phone connector 87, the lead 86 passing through an opening 88 in the compartment 82. The spool 84 and circuit board 85 communicate by means of brushes (not illustrated) to give the electrical connection.

The spool 84 is spring mounted and a release mechanism including a button 89 is used to release and retract the lead 83 as required.

When a person is using the device 70 as a personal hands free kit with their mobile phone, the lead 83 is retractable so that its length is suitable for the person and situation of its use and that it is out of the way when not in use.

Figure 17:
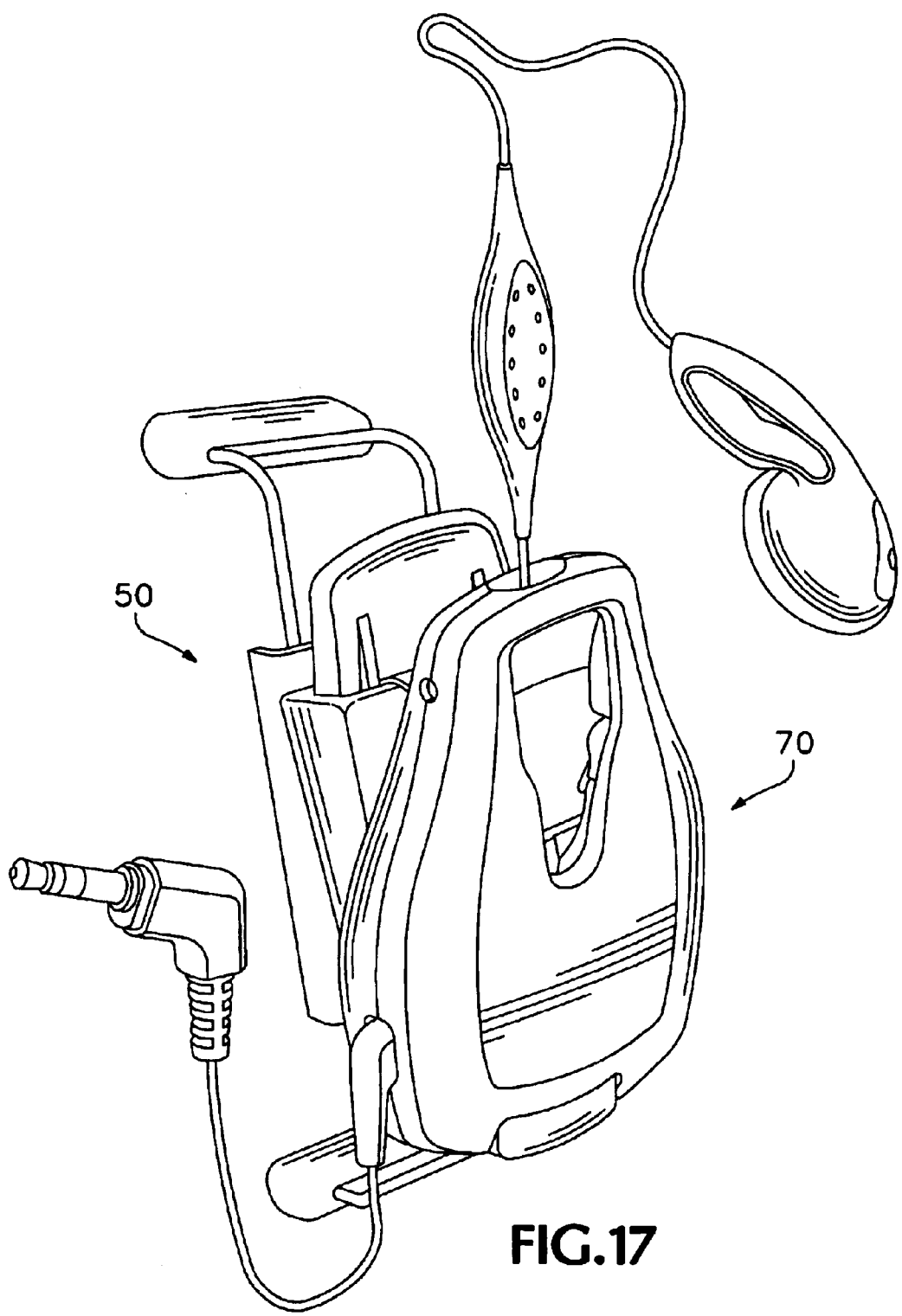
FIG. 17 is a front perspective view of a retractor belt clip device of FIG. 15 used with a vent clip of FIG. 13 according to a still further embodiment of the invention.
Figure 18:
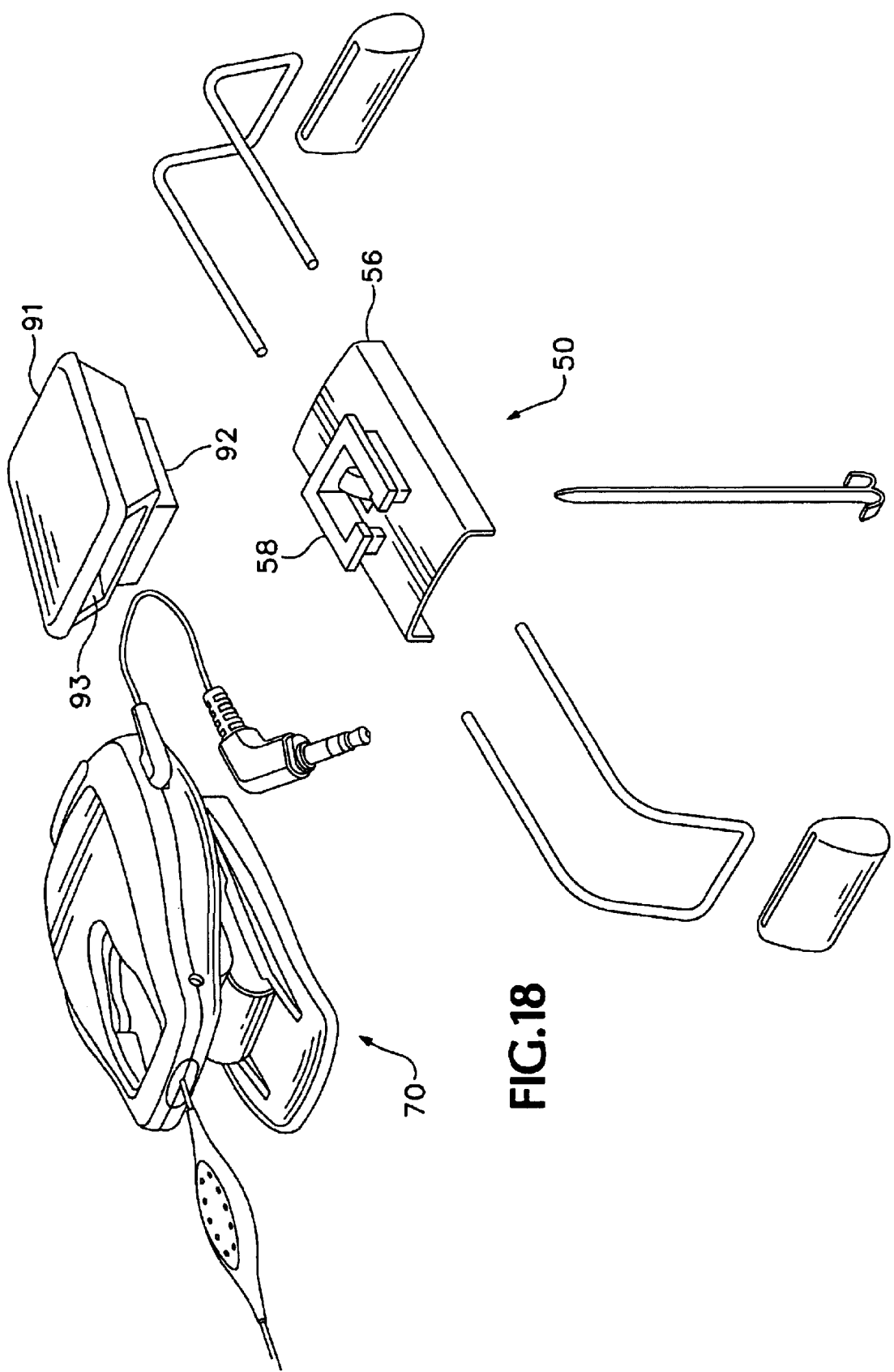
FIG. 18 is an exploded perspective view of the retractor device and vent clip device of FIG. 17.

In FIGS. 17 and 18 the retractor belt clip device 70 is used to hold a mobile phone in the vent clip device 50 by using a adapter 91 which has a bracket 92 to engage with bracket 58 of the vent clip attachment part 56. The adapter 91 further includes a receptacle 93 adapted to receive the clip 72 of the device 70.

The combination of the devices 50 and 70 allows for the device 70 to be removed from the belt and placed into the device 50 as seen in FIG. 18 and thus the personal hands free kit can be used while in the motor vehicle without being removed from the retractor clip device 70.

The foregoing describes only some embodiments of the present invention, and modifications obvious to those skilled in the art can be made thereto without departing from the scope of the present invention.

What is claimed is:

1. A device for the attachment of a mobile phone such that the mobile phone is held securely using a lug fastener which is received in a receptacle, said attachment device consisting of a pendant device to which a tether is attached, said pendant device including a body having a front side with said receptacle to receive the lug fastener, wherein the receptacle has an opening sized to receive the full diameter of a protruding flange of the lug fastener, and a holding portion having a slot in the front aide, the protruding flange being captured behind the front side with the stem of the lug fastener extending through a slot when in the held position.

2. The device according to claim 1 wherein a spring clip is provided to hold the protruding flange when it is in the held position, the protruding flange and hence the mobile phone being able to rotate when held.

3. A device for the attachment of a mobile phone such that the mobile phone is held securely using a lug fastener which is received in a receptacle, said attachment device consisting of a general purpose clip device which is fixable to another object, the general purpose clip device including a body having a front side with a receptacle to receive the lug fastener and a rear side which is fixable to the other object, wherein the receptacle has an opening sized to receive the full diameter of a protruding flange of the lug fastener, and a holding portion having a slot in the front side, the protruding flange being captured behind the front side with the stem of the lug fastener extending through a slot when in the held position.

4. The device according to claim 3 wherein a spring clip is provided to hold the protruding flange when it is in the held position.

5. The device according to claim 4 wherein the device further includes an alignment guide means to correctly align the protruding flange within the receptacle, the protruding flange having corresponding alignment guide means.

6. The device according to claim 5 wherein the phone is held in an upright orientation.

7. The device according to claim 6 wherein the device is fixed by means of screws which are inserted from within the receptacle, the front side of the device being detachable to allow access.

8. A device for the attachment of a mobile phone such that the mobile phone is held securely using a lug fastener which is received in a receptacle, said attachment device consisting of an armband device suitably held on a limb of a person by an armband, the armband device including a body having a front side with a receptacle to receive the lug fastener and a rear side which is fixable to the other object, wherein the receptacle has an opening sized to receive the full diameter of a protruding flange of the lug fastener, and a holding portion having a slot in the front side, the protruding flange being captured behind the front side with the stem of the lug fastener extending through a slot when in the held position.

9. The device according to claim 8 wherein a spring clip is provided to hold the protruding flange when it is in the held position.

10. The device according to claim 9 wherein the device further includes an alignment guide means to correctly align the protruding flange within the receptacle, the protruding flange having corresponding alignment guide means.

11. The device according to claim 10 wherein the phone is held in an upright orientation.

12. The device according to claim 11 wherein the body further includes side extensions having slots therein to receive the armband and thus hold the device abutting against the limb when in use.

13. A device for the attachment of a mobile phone such that the mobile phone is held securely using a lug fastener which is received in a receptacle, said attachment device consisting of a laptop cradle device which is securable to a laptop computer, the laptop cradle device including a body having front and rear sides with a pair of opposing slots to receive a the lug fastener with a stem of the lug fastener extending through a slot and a protruding flange of the lug fastener being positioned on the rear side with the phone being positioned on the front side when in the held position.

14. The device according to claim 13 wherein the device further includes a releasable clamp means to clamp onto the side of the display portion of the laptop computer, the releasable clamp means being adjustable to fit onto varying thicknesses found with different makes of laptop computers.

15. The device according to claim 13 wherein the opposing slots are provided in order that the device can be fixed to either the left or right side of the display portion.

16. A device for the attachment of a mobile phone such that the mobile phone is held securely using a lug fastener which is received in a receptacle, said attachment device consisting of a vent clip device for a motor vehicle such that the phone is held in a position in the cabin adjacent the driver, the vent clip device including a body having a front side with a receptacle to receive the lug fastener and a rear side which is fixable to the other object, wherein the receptacle has an opening sized to receive the full diameter of a protruding flange of the lug fastener, and a holding portion having a slot in the front side, the protruding flange being captured behind the front side with the stem of the lug fastener extending through a slot when in the held position.

17. The device according to claim 16 wherein a spring clip is provided to hold the protruding flange when it is in the held position.

18. The device according to claim 17 wherein the device further includes an alignment guide means to correctly align the protruding flange within the receptacle, the protruding flange having corresponding alignment guide means.

19. The device according to claim 18 wherein the phone is held in an upright orientation.

20. The device according to claim 19 wherein the body has a rear side being mateable with a vent clip adapted to be fitted to the vents and having a pair of extendable legs and feet which are positioned and securely clamped against the vents to prevent movement, the clip being positioned across the vent either vertically or horizontally.

* * * * *